US005774061A

United States Patent [19]
Kudoh

[11] Patent Number: 5,774,061
[45] Date of Patent: Jun. 30, 1998

[54] RADIO SELECTIVE CALLING RECEIVER WITH MESSAGE DISPLAY CAPABILITY

[75] Inventor: Kazuhiro Kudoh, Tokyo, Japan

[73] Assignee: NEC Corporation, Tokyo, Japan

[21] Appl. No.: 655,966

[22] Filed: May 31, 1996

[30] Foreign Application Priority Data

Jun. 6, 1995 [JP] Japan .................................... 7-162901

[51] Int. Cl.[6] ....................................................... H04Q 7/18

[52] U.S. Cl. .................................. 340/825.44; 340/311.1; 370/313; 455/38.4; 455/526

[58] Field of Search ......................... 240/825.44, 825.52, 240/825.69, 311.1; 455/426, 31.1, 31.2, 38.4, 526, 38.2, 38.1; 370/310, 313; 368/108

[56] References Cited

U.S. PATENT DOCUMENTS

| | | | |
|---|---|---|---|
| 4,536,761 | 8/1985 | Tsunoda et al. | 340/825.44 |
| 4,894,649 | 1/1990 | Davis | 340/825.44 |
| 5,430,440 | 7/1995 | Shim | 340/825.44 |
| 5,434,563 | 7/1995 | Kudoh | 340/825.44 |
| 5,604,491 | 2/1997 | Coonley et al. | 340/825.44 |
| 5,654,697 | 8/1997 | Uchida | 340/825.44 X |

FOREIGN PATENT DOCUMENTS

| | | | |
|---|---|---|---|
| 0 218 936 | 4/1987 | European Pat. Off. . | |
| 0 498 660 | 8/1992 | European Pat. Off. . | |
| 609102-A1 | 8/1994 | European Pat. Off. | 340/825.44 |
| 61-189738 | 8/1986 | Japan . | |
| 64-69152 | 3/1989 | Japan . | |
| 2-151162 | 6/1990 | Japan . | |
| 5-236146 | 9/1993 | Japan . | |
| 5-325080 | 12/1993 | Japan . | |
| WO 92/17006 | 10/1992 | WIPO . | |

*Primary Examiner*—Brian Zimmerman
*Assistant Examiner*—William H. Wilson, Jr.
*Attorney, Agent, or Firm*—Young & Thompson

[57] ABSTRACT

A radio selective calling receiver which can continuously display a specified message during call-waiting state. The radio selective calling receiver has a RAM for storing messages, an LCD (liquid crystal display) and a CPU (central processing unit). The CPU causes a received message to be stored in the RAM, causes the received message to be displayed on the LCD from the time of receiving the message until a prescribed auto-reset time has elapsed, halts message display and transits to a normal call-waiting state after passage of the auto-reset time, and if a message stored in the RAM contains a predetermined specified character string such as "--", causes the message containing the specified character string to be displayed on the LCD during the call-waiting state.

9 Claims, 4 Drawing Sheets

RADIO SELECTIVE CALLING RECEIVER WITH MESSAGE DISPLAY CAPABILITY

BACKGROUND OF THE INVENTION

1. Field of the Invention

The present invention relates to a radio selective calling receiver, i.e., paging receiver, and particularly to a radio selective calling receiver with a message display capability that allows constant display of the contents of a message to a user during call waiting.

2. Description of the Related Art

Conventional radio selective calling receivers are premised on the assumption that a user always has the selective calling receiver close at hand, and upon receiving a calling signal containing a message, these devices both alert the user to the incoming call by a vibration or sound and display the contents of the received message on a display panel. Display of the received message then ends after the passage of a certain set time (called the "auto-reset time") even without switch operation by the user. In this case, information for the user's convenience such as the present time is generally displayed after completion of the display operation. Erasing of the display of a message upon the passage of the auto-reset time in this way serves both to reduce consumption of electric power attending the display operation as well as to dispense with the annoyance of operating the switches of the message display.

With the popularization of radio selective calling receivers in recent years, these devices have come to be used in a wide variety of ways. Moreover, the types of characters used in the message display of radio selective calling receivers have expanded from mere numerals of former devices to include letters of the alphabet or the Japanese syllabary ("kana"), and even to include Chinese characters. With this popularization of calling devices and expansion in the types of displayable characters, radio selective calling receivers no longer serve merely to transmit simple messages but can now be applied effectively as message boards or memos by displaying detailed messages using many types of characters.

However, considering a case in which a radio selective calling receiver according to the above-described prior art receives a message for a user when the user is not carrying the receiver but has left it at some other location, display of the message contents will be automatically ended after passage of the auto-reset time, and the message will therefore not be conveyed to the user upon his return to the calling receiver. Consequently, transmission of a particular message to a user by way of a radio selective calling receiver that is not with the user requires constant display of the message content.

Japanese Patent Laid-open Application No. Hei 5-325080 (JP, A, 5-325080) discloses a device used in a security system for an office building or housing complex in which coded message data are received by a radio selective calling receiver and the message content corresponding to this code is displayed on the receiver as a "while-you-were-away" message, thereby enabling, for example, notification of an irregularity to a manager. Japanese Patent Laid-open Application No. Sho 61-189738 (JP, A, 61-189738) discloses a device in which, in the event of incoming calls for a user when the user is absent, the radio selective calling receiver can be used to notify the user of the incoming call and, for example, the caller's telephone number can be displayed on the radio selective calling receiver. Japanese Patent Laid-open Application No. Hei 2-151162 (JP, A, 2-151162) discloses a system in which, when a telephone user is not available, the radio selective calling receiver can be automatically called without ringing the telephone, and the caller's telephone number can be displayed on the receiver. Japanese Patent Laid-open Application No. Sho 64-69152 (JP, A, 64-69152) discloses a telephone having a display panel which can automatically respond and receive destination information when the user is not available, and display, for example, the destination telephone number or the user's estimated time of return. Japanese Patent Laid-open Application No. Hei 5-236146 (JP, A, 5-236146) discloses a destination display device in which destination information can be modified by remote operation from an outside location by way of a telephone line. However, none of the above-described disclosed art allows the constant display of any message.

SUMMARY OF THE INVENTION

The object of the present invention is to provide a radio selective calling receiver with a message display capability that allows the sustained display of a specified message.

The object of the present invention can be achieved by a radio selective calling receiver that receives radio calling signals containing messages and displays received messages, and that includes:

storage means that stores the message;

display means for displaying the message; and display control means that causes a received message to be stored in the storage means, causes the received message to be displayed on the display means from the time of receiving the message until a prescribed auto-reset time has elapsed, halts message display and transits to a normal call-waiting state after the passage of the auto-reset time, and if a message stored in the storage means contains a predetermined specified character string, causes the message containing the specified character string to be displayed on the display means during the call-waiting state.

By means of the above-described construction, when a message containing a predetermined specified character string is stored in the storage means, sustained display of this message is enabled during the normal call-waiting state. Accordingly, a message can be reliably conveyed to the user even when the user is not carrying the radio selective calling receiver. In addition, when messages not containing the specified character string are sent, message display can be automatically ended after the auto-reset time.

The above and other objects, features, and advantages of the present invention will become apparent from the following description based on the accompanying drawings which illustrate an example of a preferred embodiment of the present invention.

DETAILED DESCRIPTION OF THE PREFERRED EMBODIMENTS

A preferable embodiment of the present invention will next be explained with reference to the accompanying drawings.

Figure 1:
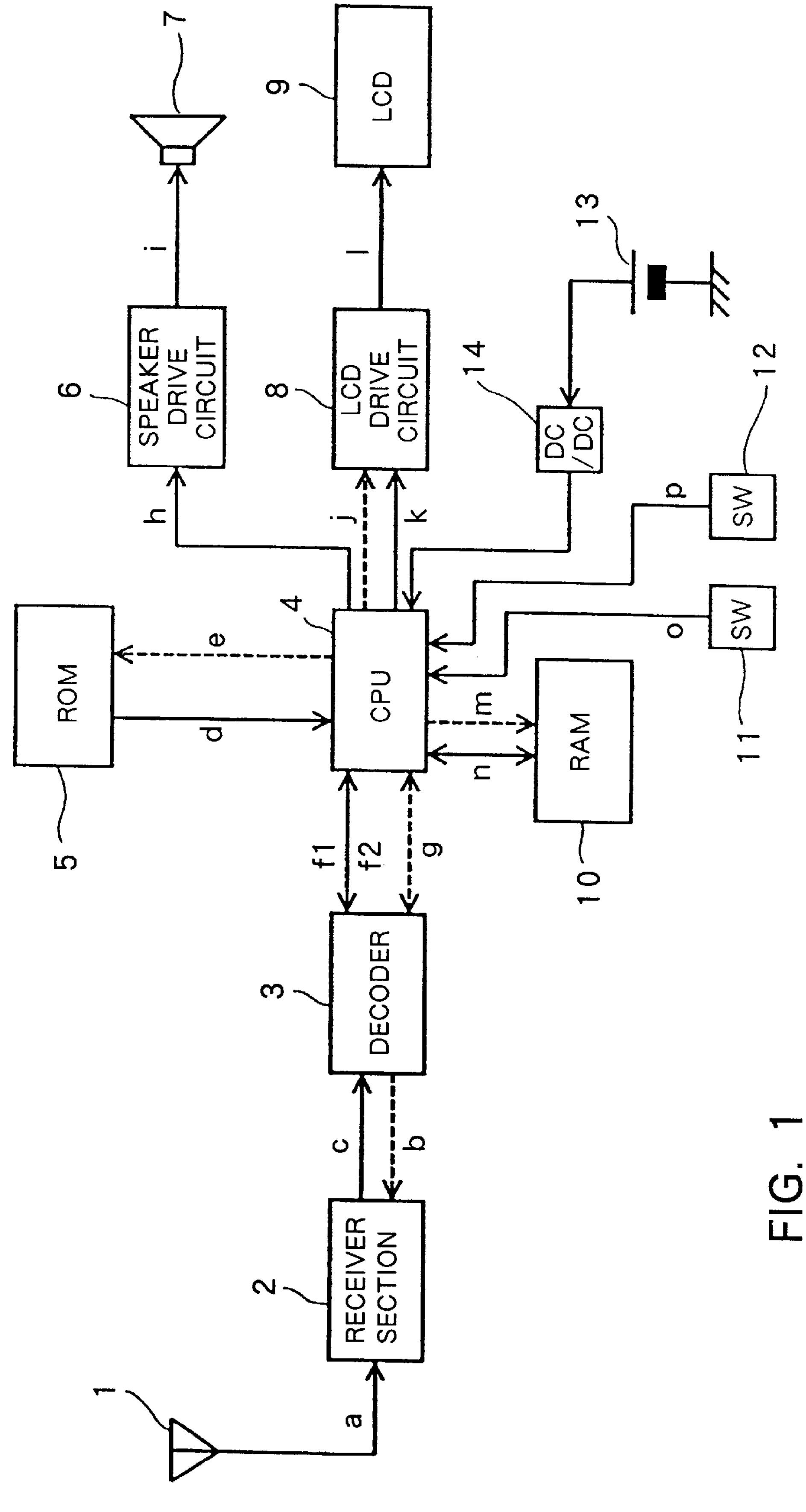
FIG. 1 is a block diagram showing a radio selective calling receiver with a message display capability according to a preferable embodiment of the present invention.

As shown in FIG. 1, in a radio selective calling receiver according to a preferable embodiment of the present invention, antenna 1 is connected to receiver section 2, decoder 3 for decoding a received signal is connected to receiver section 2, and the output of decoder 3 is connected to CPU (central processing unit) 4. Both ROM (Read Only Memory) 5 in which is stored, for example, a selective call number (ID number) specific to this radio selective calling receiver, and RAM (Random Access Memory) 10 for storing received information are connected to CPU 4. In addition, switches 11 and 12 are also connected to CPU 4 for halting display operation or for performing read and display operations of messages within RAM 10. Operation signals o and p are outputted to CPU 4 from switches 11 and 12, respectively.

This radio selective calling receiver is provided with speaker 7 and LCD (Liquid Crystal Display) 9 for alerting the user of the reception of a call signal and for displaying the contents of a received message. Speaker 7 is driven by CPU 4 by way of speaker drive circuit 6, and LCD 9 is driven by CPU 4 by way of LCD drive circuit 8. Battery 13 is used as the power supply of this receiver, the voltage of battery 13 being boosted to approximately 3 V by DC-DC converter 14 and supplied to each circuit beginning with CPU 4. CPU 4 has a clock function, displays the current time on LCD 9 during call-waiting state, and when storing a message to RAM 10, can also store in RAM 10 the reception time of the message. Moreover, as supplementary functions, this radio selective calling receiver may also be provided with, for example, a telephone number registry function for referencing telephone numbers or an alarm function for generating alarms at set times.

The radio selective calling receiver according to this embodiment is constructed such that, if a message containing a predetermined character string is stored in RAM 10, the content of this message can be constantly displayed during the call-waiting state that follows the completion, due to the passage of a certain set time (auto-reset time), of the basic display operation of a received message or the display operation accompanying a supplementary function. Messages not containing the predetermined character string are cleared from the display upon passage of the auto-reset time. Such control of message display is performed by CPU 4, which is a display control means. In this case, the minus sign "–" repeated twice "––" is used as the predetermined character string.

The operation of this radio selective calling receiver will next be explained.

Radio frequency signal a received at antenna 1 is amplified and demodulated in receiver section 2 to become digital signal c which is then inputted to decoder 3. Receiver section 2 is controlled by control signals b from decoder 3. When signal c is inputted to decoder 3, CPU 4 sends read signal e to ROM 5, a receiver-specific selective call number (ID number) d stored in ROM 5 is read, and signal g representing this call number is sent to decoder 3. Decoder 3 performs comparison/collation of the selective call number contained in the received signal (digital signal c) and the receiver-specific selective call number (signal f1). If as a result of collation the two selective call numbers match, decoder 3 sends received message f2 continuing after the selective call number to CPU 4.

When message f2 is inputted, CPU 4 outputs control signal ht o speaker drive circuit 6, whereby drive signal i is sent from speaker drive circuit 6 to speaker 7 and speaker 7 sounds to notify the user that a message has been received. CPU 4 simultaneously sends control signal j and display data k corresponding to message f2 to LCD drive circuit 8, thus causing drive signal 1 to be outputted from LCD drive circuit 8 and display of the received message on LCD 9. At this time, CPU 4 sends write signal m to RAM 10 and stores the received message in RAM 10 as message n.

The notification and display operations by means of speaker 7 and LCD 9 are halted after the passage of a predetermined time (auto-reset time), but the user can halt the operation before the passage of the auto-reset time by pressing switch 11.

However, if the predetermined character string "––" contained within the received message f2, CPU 4 constantly displays the message following the predetermined character string "––" on LCD 9 even when in the call-waiting state in which the notification operation has ended, i.e., the state following completion of the basic message display operations such as display of a caller's telephone number or display operations attendant to supplementary functions. This display operation is continued until the next switch operation is performed. Of course, if a message containing the predetermined character string is among the messages stored in RAM 10, the message is displayed during the call-waiting state. Finally, string "##" or the like may also be used as the predetermined character string for causing constant display in place of the above-described "––".

Because a received message n is written to RAM 10 by CPU 4 as described hereinabove, by pressing switch 11, a user can cause message n stored in RAM 10 to be read out by CPU 4 and the content of the message to be displayed on LCD 9 by way of LCD drive circuit 8 even after completion of the notification/display operation for an ordinary message, i.e., a message not containing the predetermined character string. This message display operation also halts with the passage of the autoreset time from pressing switch 11, but the display operation can also be halted even before the passage of the auto-reset time by again pressing switch 11. Furthermore, next pressing an additional switch 12 causes the display to switch to the next most recently received message.

Figure 2A:
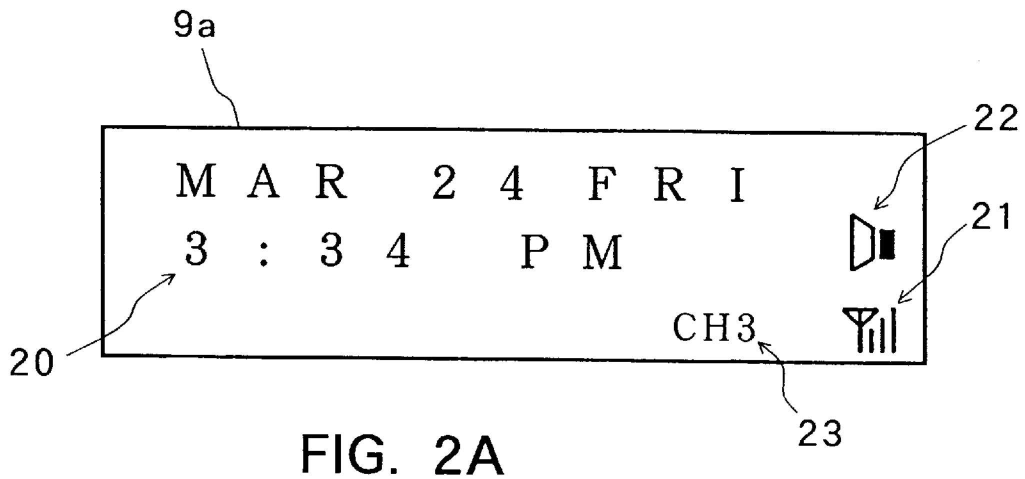
FIG. 2A shows an example of the display screen of the radio selective calling receiver of FIG. 1 during a normal call-waiting state.
Figure 2B:
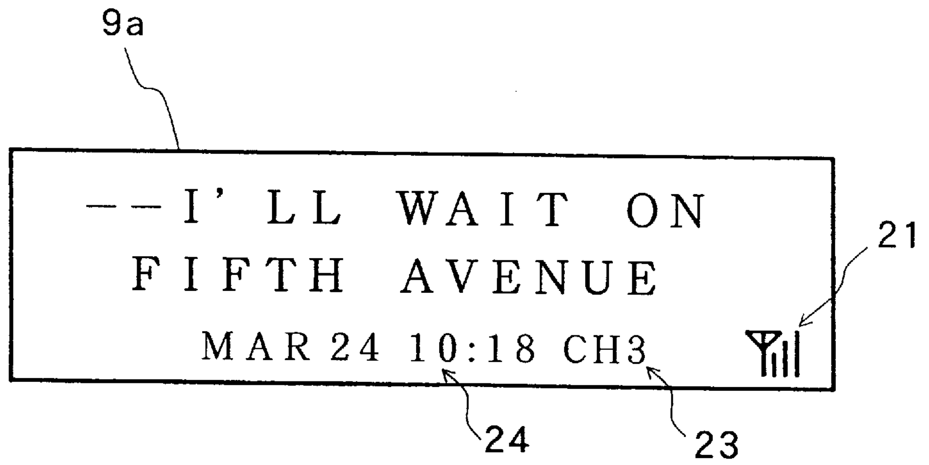
FIG. 2B shows an example of the display screen of the radio selective calling receiver of FIG. 1 during display of a message containing a specified character string.

FIGS. 2A and 2B show examples of screens displayed in display window 9*a* of LCD 9 of this radio selective calling receiver. FIG. 2A is an example of the normal call-waiting state display in which the present time 20 is displayed together with graphical representations of the operation states of the device, symbol 21 showing the reception state, symbol 22 showing the notification mode, and symbol 23 showing the reception channel. This screen is displayed upon completion of the notification operation or display operation of a message. In the illustrated example, the present time is indicated as "Friday, March 24, 3:34 p.m." Obviously, if the present time is displayed in minute units, this display of the present time is updated each minute.

If a message such as "––I'LL WAIT ON FIFTH AVENUE" containing the predetermined character string "––" is among the messages stored in RAM 10, the message "––I'LL WAIT ON FIFTH AVENUE" is constantly displayed during the call-waiting state as shown in FIG. 2B. Symbol 24, appearing in the lower portion of the display in the figure indicates the time of receiving the currently displayed message. In this example, the currently displayed message was received on March 24 at 10:18.

Figure 3A:
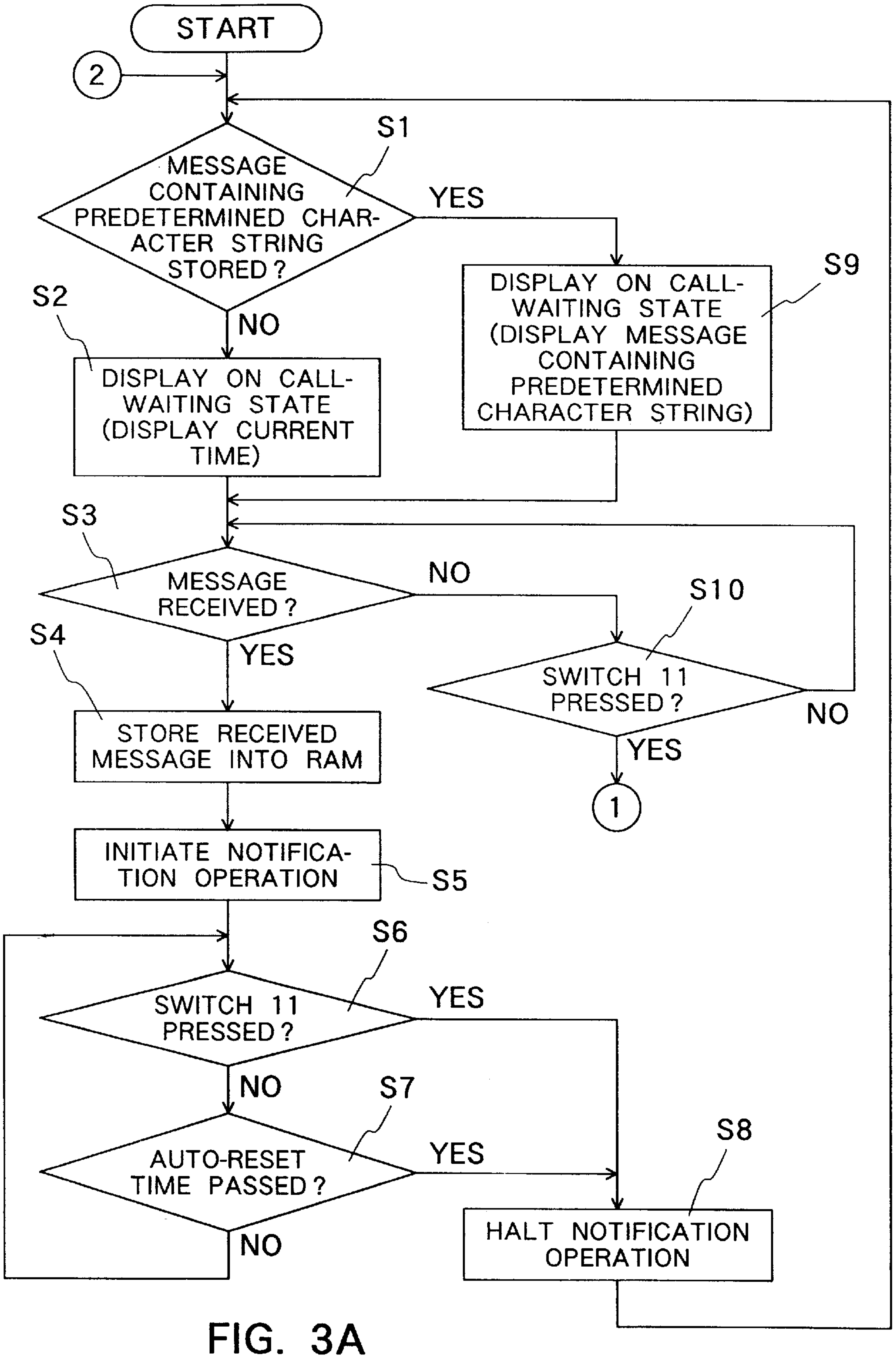
FIGS. 3A and 3B are flow charts illustrating the operation of the radio selective calling receiver of FIG. 1.
Figure 3B:
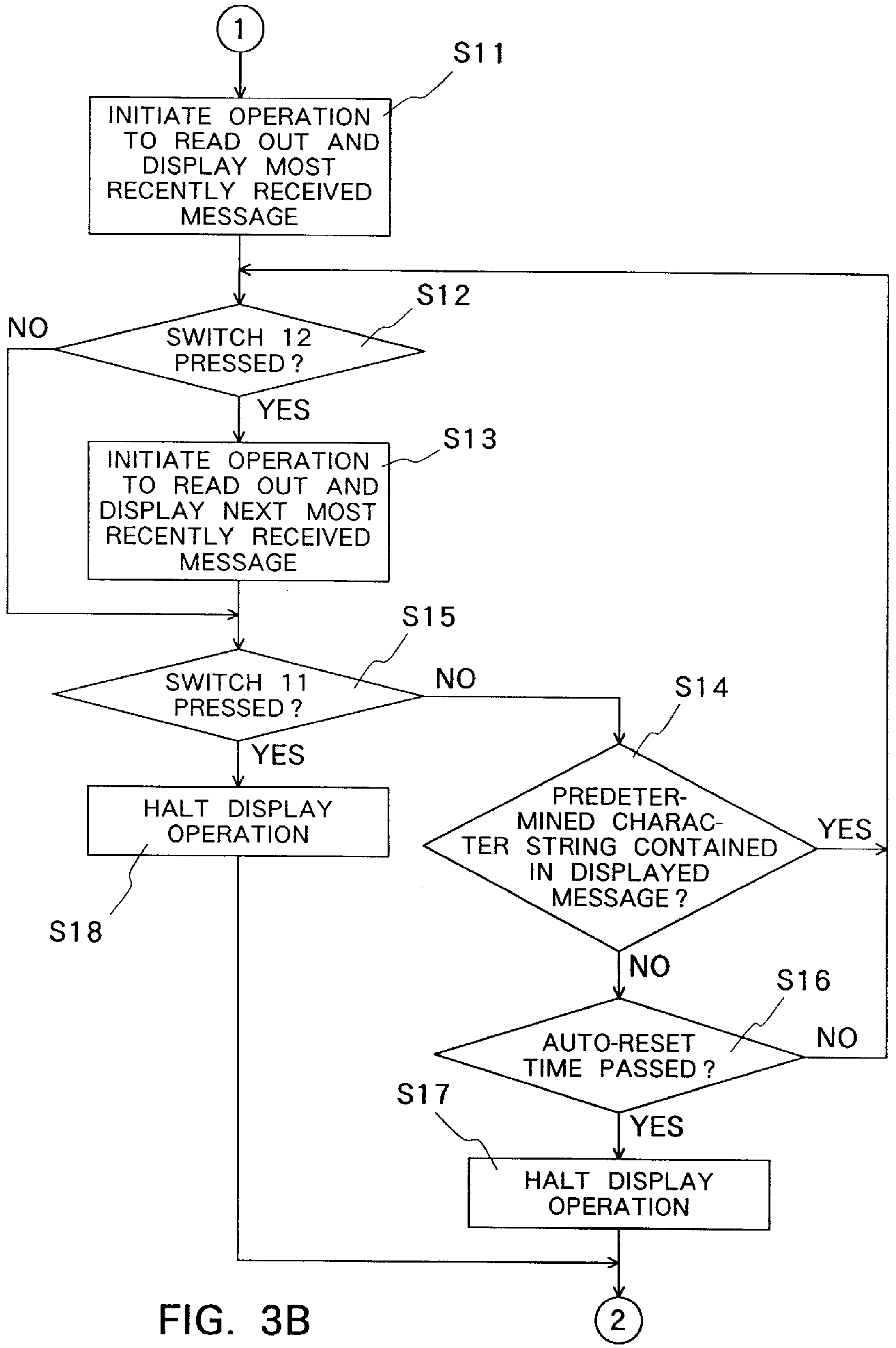

The progression of operations will next be explained in further detail with reference to FIGS. 3A and 3B. Here, operation beginning from a time point during the call-waiting state will be explained.

In Step S1, it is first judged whether or not a message containing the predetermined character string is stored in RAM 10. If no message containing the predetermined character string is stored, the process advances to Step S2 on the assumption of a normal call-waiting state, the current time is displayed as shown in FIG. 2A, and the process advances to Step S3. On the other hand, if a message containing the predetermined character string is stored in RAM 10 at Step S1, the message is displayed as shown in FIG. 2B at step S4 and the process advances to Step S3.

At Step S3 it is judged whether or not a message is received, the process advancing to Step S4 if a message is received, or conversely, advancing to Step S10 where it is judged whether or not switch 11 has been pressed. If it is not detected at Step S10 that switch 11 has been pressed, the process returns to Step S3, and as a result, the display state of Step S2 or Step S9 is continued as the call-waiting state as long as no message is received and switch 11 is not pressed.

If message reception is detected at Step S3, CPU 4 stores the received message in RAM 10 (Step S4), then initiates the notification/display operations to show that a message has been received (Step S5), and the process advances to Step S6. In this case, the notification/display operations are performed by the generation of an alert sound from speaker 7 and display of the received message on LCD 9. At Step S6, it is judged whether switch 11 has been pressed or not, the process advancing to Step S8 if activation of switch 11 is detected, and if not detected, it is judged at Step S7 if the auto-reset time has passed. If the auto-reset time has not passed, the process returns to Step S6, and if the auto-reset time has passed, the process advances to Step S8. At Step S8, the notification/display operation is halted and the process returns to Step S1. According to the above processing, following initiation of the notification/display operation of Step S5, the notification/display operation is continued until switch 11 is pressed or the auto-reset time has elapsed, and after the notification/display operation is halted, the operation of the above-described call-waiting state is performed. Here, if the auto-reset time passes and the notification/display operation ends, it is likely that the user has not checked messages received up to that time, and these messages are consequently treated as unread messages and are given priority over other messages until read out by switch operation. These messages are also distinguished from other messages when, for example, messages are erased from the display or RAM 10.

If activation of switch 11 is detected in the above-described call-waiting state of Step S10, the process advances to Step S11, and the operations are initiated to read out and display on LCD 9 the messages stored in RAM 10. The message read out first at this time is the most recently received message. The process then advances to Step S12. Step S12, which is performed while messages are being read out and displayed, judges whether separate switch 12 is pressed or not. If switch 12 is pressed, read-out and display of the next most recent message is started in Step S13 and the process advances to Step S15, and if switch 12 is not pressed, the process advances directly to Step S15. Through this operation, the displayed message can be selected. At Step S15 it is judged if switch 11 is pressed or not, and if pressed, the process advances to Step S18 where, after halting display, the process returns to Step S1. If switch 11 is not pressed, the process advances to Step S14, and it is judged whether the currently displayed message includes the predetermined character string.

If a message containing the predetermined character string is being displayed in Step S14, the process returns to Step S12, and if the message does not contain the predetermined character string, the process advances to Step S16 where it is judged whether the auto-reset time has passed or not. If the auto-reset time has passed, the display operation is halted in Step S17, following which the process returns to Step S1. If the auto-reset time has not passed, the process returns to Step S12. In accordance with the above steps, display of a message lacking the predetermined character string is terminated by either activation of switch 11 or passage of the auto-reset time. On the other hand, a message containing the predetermined character string is continuously displayed until switch 11 is pressed regardless of passage of the auto-reset time, and by pressing both switch 11 and switch 12, another message can be displayed. In this case, however, a message containing the special character string is displayed during the call-waiting state despite termination of the display operation of a message by pressing switch 11.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A radio selective calling receiver that receives radio calling signals that include messages, the receiver having a display that displays a received message and storage that stores the received messages, and further comprising:

a control processor that directs storage of the received messages in the storage, directs display of a recently received one of the messages on the display until a prescribed auto-reset time has elapsed since receipt of the one message, and at the end of the auto-reset time, causes display of a further one of the messages in the storage that includes a specified character string so that the further one of the messages is displayed between displays of the recently received messages for their respective auto-reset times.

2. A method of displaying messages in a radio selective calling receiver that receives radio calling signals that include the messages, the receiver having a display that displays a received message and storage that stores the received messages, the method comprising the steps of:

storing the received messages in the storage;

displaying a recently received one of the messages on the display until a prescribed auto-reset time has elapsed since receipt of the one message; and at the end of the auto-reset time, displaying a further one of the messages in the storage that includes a specified character string so that the further one of the messages is displayed between displays of the recently received messages for their respective auto-reset times.

3. A radio selective calling receiver that receives radio calling signals containing messages and displays received messages, comprising:

storage means that stores the message;

display means for displaying the message; and display control means that causes a received message to be stored in said storage means, causes said received message to be displayed on said display means from the time of receiving said message until a prescribed auto-reset time has elapsed, halts message display and transits to a normal call-waiting state after passage of said auto-reset time, and if a message stored in said storage means contains a predetermined specified character string, causes said message containing said specified character string to be displayed on said display means during said call-waiting state.

4. A radio selective calling receiver according to claim 3 provided with a speaker for notifying a user of the reception of said radio calling signals.

5. A radio selective calling receiver according to claim 3 provided with switches whereby, if a message containing said specified character string is stored in said storage means, the display operation of this message continues until switch operation to cause read-out and display of other messages stored in said storage means.

6. A radio selective calling receiver according to claim 3 wherein a first switch is provided for halting display operation and said display control means halts display of a currently displayed message upon detecting operation of said first switch.

7. A radio selective calling receiver according to claim 6 provided with a second switch for displaying a next message, and said display control means reads a next most recent message from said storage means and displays said next most recent message on said display means upon detecting operation of said second switch after operation of said first switch.

8. A radio selective calling receiver according to claim 3 wherein the current time is displayed on said display means during said call-waiting state if a message containing said specified character string is not stored in said storage means.

9. A radio selective calling receiver according to claim 3 wherein, when a message containing said specified character string is displayed on said display means, said display control means displays the time of receiving that message on said display means together with the message.

* * * * *